United States Patent Office 2,819,312
Patented Jan. 7, 1958

2,819,312
PROCESS FOR THE MANUFACTURE OF POLYENE ALDEHYDES

Otto Isler, Marc Montavon, and Rudolf Rüegg, Basel, and Paul Zeller, Neuallschwil, near Basel, Switzerland, assignors to Hoffmann-La Roche Inc., Nutley, N. J., a corporation of New Jersey No Drawing. Application July 13, 1956
Serial No. 597,567

Claims priority, application Switzerland July 22, 1955

4 Claims. (Cl. 260—598)

This invention relates to a new process for the preparation of polyene aldehydes. This process comprises condensing in an inert solvent a 2,6,6-trimethyl-cyclohexyliden-ethyliden-triarylphosphine compound, the aryl groups of which may carry alkyl or alkoxy radicals, with a compound selected from the group consisting of acetals of 2-oxo-propanal-(1), of 4-oxo-pentene-(2)-al-(1) and of 2-methyl-6-oxo-heptadiene-(2,4)-al-(1), heating the reaction mixture and hydrolyzing the acetal formed in the presence of acid.

In the first stage of the comprehensive process an acetal of 2-oxo-propanal-(1) or 4-oxo-pentene-(2)-al-(1) or 2-methyl-6-oxo-heptadiene-(2,4)-al-(1) is condensed with the 2,6,6-trimethylcyclohexyliden-ethyliden-triarylphosphine compound; the next stage comprises splitting off triarylphosphine oxide, thus producing a polyene aldehyde acetal. Both steps, the condensation and the separation of triarylphosphine oxide, are advantageously carried out in the same vessel without isolation of the intermediate. The condensation step is preferably effected in the presence of an inert solvent, such as for instance ether, petroleum ether, benzene, dioxan, tetrahydrofuran, methylene chloride, using equivalent quantities of the starting materials. Thus, the compounds may be mixed in a vessel while stirring at room temperature or at elevated temperature, whereby the air is suitably replaced by an inert gas, such as nitrogen. The condensation is preferably carried out by using lower aliphatic acetals of 2-oxo-propanal-(1) or 4-oxo-pentene-(2)-al-(1) or 2-methyl-6-oxo-heptadiene-(2,4)-al-(1), such as the dimethyl, diethyl or dibutyl acetals, or cyclic acetals, such as ethylene or propylene acetals; the preferred 2,6,6-trimethylcyclohexyliden - ethyliden - triarylphosphine compound is 2,6,6 - trimethylcyclohexyliden - ethyliden - triphenylphosphine. Upon addition of a solution of the acetal to a solution of 2,6,6-trimethylcyclohexyliden-ethyliden-triarylphosphine the exothermic condensation immediately takes place. Depending on the solvent and the starting compound used, the condensation products remain in solution or precipitate; in the latter case the solution is mostly decolorated or at least lightened. In a preferred embodiment of the condensation step, the acetal compound is dissolved in benzene and the benzene solution is added to a suspension or a solution of 2,6,6-trimethylcyclohexyliden - ethyliden - triarylphosphine, whereby the condensation product precipitates. Upon standing, the condensation products are slowly decomposing into the corresponding polyene aldehyde acetals and triarylphosphine oxide; upon heating, this decomposition takes place quickly. For instance, the decomposition may easily be performed by heating the reaction mixture for several hours to 35-80°. After completion of the reaction, the polyene aldehyde acetals are separated from the triarylphosphine oxide formed, for instance by shaking the organic layer with water and may be isolated by concentrating the dried solution. The acetals may be purified and separated from adherent organic phosphorous compounds by repartition between solvents or by chromatography or by distillation. There are thus obtained practically pure polyene aldehyde acetals as colorless or weakly yellow colored oils, showing characteristic absorption maxima in the ultraviolet spectrum. When using acetals of 2-oxo-propanal-(1), there are obtained 4-[2,6,6-trimethylcyclohexyliden]-2-methyl-butene - (2)-al-(1)-acetals having an U. V. absorption maximum at 248 m$\mu$ in petroleum ether. When using acetals of 4-oxo-pentene-(2)-al-(1), there are obtained 6-[2,6,6-trimethylcyclohexyliden] -4 -methyl - hexadiene - (2,4) - al - (1)-acetals showing an U. V. absorption maximum at 286 m$\mu$ in petroleum ether. When using acetals of 2-methyl-6-oxo-heptadiene-(2,4)-al-(1) there are obtained 8-[2,6,6 - trimethylcyclohexyliden] - 2,6 - dimethyl - octatriene-(2,4,6)-al-(1)-acetals with U. V. absorption maxima at 307, 321 and 338 m$\mu$ in petroleum ether.

In the final stage of the comprehensive process, the polyene aldehyde acetals obtained are hydrolyzed in acidic medium, thus producing the corresponding polyene aldehydes. The hydrolysis is performed in a manner known per se, e. g. by stirring the polyene aldehyde acetals in the presence of water in a water-miscible solvent with a mineral acid, such as sulfuric acid, or with an organic acid, such as acetic acid or p-toluene sulfonic acid at room temperature or elevated temperature. In an advantageous embodiment of the hydrolysis stage, the polyene aldehyde acetals are heated with 90% acetic acid for a short time to 95°, or they are stirred in alcoholic solution with dilute sulfuric acid for several hours. In order to avoid loss of substance due to decomposition, it is advisable to perform the reaction in the presence of an inert atmosphere and to add an antioxidant.

The polyene aldehydes obtained by the process of the present invention, i. e. 4-[2,6,6-trimethylcyclohexyliden]-2 - methyl - butene - (2) - al-(1), 6-[2,6,6-trimethylcyclohexyliden]-4-methyl-hexadiene-(2,4)-al-(1) and 8-[2,6,6-trimethylcyclohexyliden]-2,6 - dimethyl - octatriene - (2,-4,6)-al-(1) show characteristic absorption maxima in the ultraviolet spectrum. Due to the cis-trans-isomerism at the double bonds, there exist various steric forms of these aldehydes.

The products of the comprehensive process are valuable intermediates in the synthesis of vitamin A and $\beta$-carotene. Thus the compound 4-[2,6,6-trimethylcyclohexyliden]-2-methyl-butene-(2)-al-(1) can be converted into vitamin A, e. g. by condensing it with 1-hydroxy-3-methyl-penten-(2)-yne-(4), subjecting the condensation product obtained in any desired sequence to acetylation and partial hydrogenation at the triple bond and treating the ester formed with dehydrating agents. 6-[2,6,6-trimethylcyclohexyliden]-4-methyl-hexadiene-(2,4)-al-(1) can be converted into 8-[2,6,6-trimethylcyclohexyliden]-2,6-dimethyl-octatriene-(2,4,6)-al-(1) by acetalisation, condensation of the acetal formed with a propenyl ether and heating the condensation product with acid. When condensing 8 - [2,6,6 - trimethylcyclohexyliden] - 2,6 - dimethyl-octatriene-(2,4,6)-al-(1) with acetylene, subsequently splitting off 2 mols of water with rearrangement, partially hydrogenating the triple bond and isomerising the compound produced there is obtained $\beta$-carotene.

EXAMPLE 1

(a) *4-[2,6,6-trimethylcyclohexyliden]-2-methyl-buten-(2)-al-(1)-ethylene acetal*

To a deep red suspension of 2,6,6-trimethylcyclohexyliden-ethyliden-triphenylphosphine—prepared from 9.8 g. of 2,6,6-trimethylcyclohexyliden-ethyl-triphenyl-phosphonium bromide (of melting point 217–218°) and 1.84 g. of phenyl lithium in 80 ml. of dried diethyl ether—was gradually added, while stirring in a nitrogen atmosphere, a solution of 2.4 g. of 2-oxo-propanal-(1)-ethylene acetal (B. P.$_{10}$: 102°; $n_D^{26}$=1.4845) in 10 ml. of dry benzene. There was formed a voluminous precipitate while the solution decolorated. After further stirring for 20 minutes, 120 ml. of dry benzene were added, the ether was driven off, until the reaction mixture reached a temperature of 60°. The mixture was then stirred in a hydrogen atmosphere for further six hours at 60°. After cooling down, the precipitate was separated by filtration, the filtrate was washed with water, dried over sodium sulfate and the solvent was evaporated. In order to remove adherent phosphorus containing impurities the residue was dissolved in a little petroleum ether, passed through a short column of aluminium oxide (according to Brockmann, degree of activity II) and the petroleum ether was driven off. There was thus obtained 3.5 g. of 4-[2,6,6-trimethylcyclohexyliden] - 2 - methyl - buten - (2) - al - (1)-ethylene acetal. After distillation in vacuo there was obtained a nearly colorless product. B. P.$_{0.02}$: 100°; U. V. absorption maximum at 248 mµ in petroleum ether.

(b) *4-[2,6,6-trimethylcyclohexyliden]-2-methyl-butene-(2)-al-(1)*

To 6 g. of 4-[2,6,6-trimethylcyclohexyliden]-2-methyl-buten-(2)-al-(1)-ethylene acetal dissolved in 80 ml. of ethanol were added 14 ml. of 3 n sulfuric acid and the mixture was refluxed for 30 minutes. The mixture was then diluted with 200 ml. of ice water, extracted with 100 ml. of petroleum ether, the petroleum ether solution was washed with water and 5% sodium bicarbonate solution, then dried with sodium sulfate, and the solvent was driven off. There was obtained 4-[2,6,6-trimethylcyclohexyliden]-2-methyl-butene-(2)-al-(1), which can be purified by distillation. B. P.$_{0.02}$: 85°; U. V. absorption maximum at 288 mµ in petroleum ether. The phenyl-semicarbazone recrystallized from a mixture of methylene chloride and methanol formed colorless prisms of M. P. 158–159°; U. V. absorption maximum at 314 mµ in petroleum ether.

The starting materials required in the process described in the above example can for instance be prepared as follows:

*2-oxo-propanal-(1)-ethylene acetal.*—1 mol of methylglyoxal and 1.2 mol of ethylene glycol were heated for several hours in 250 ml. of benzene in the presence of a catalytic quantity of p-toluene sulfonic acid, while continuously distilling off the water formed. The reaction mixture was then cooled down, poured on cold sodium bicarbonate solution, the benzene solution was separated, dried over sodium sulfate and the solvent was driven off. By distillation of the residue, there was obtained the ethylene acetal of methylglyoxal (B. P.$_{10}$: 102°; $n_D^{26}$= 1.4845).

*2-oxo-propanal-(1)-dialkyl-acetals.*—The dialkyl acetals of methylglyoxal, such as the diethyl acetal, can be prepared e. g. according to the procedure described in Beilstein, I. Ergänzungswerk [1928], page 395.

*4-oxo-pentene-(2)-al-(1)-acetals.*—Propiolaldehyde acetal was condensed with acetaldehyde, the triple bond of the compound formed was partially hydrogenated and the hydroxy group was oxidized with manganese dioxide.

*2-methyl-6-oxo-heptadiene-(2,4)-al-(1)acetals.*—Methylmalonic dialdehyde was transformed into the enol ether by heating the same with an alcohol in an inert solvent in the presence of an acidic condensation agent and continuously distilling off the water formed. The enol ether was condensed with lithium acetylide and hydrolized with acid; the 2-methyl-penten-(2)-yne-(4)-al-(1) was acetalized, the acetal formed was condensed by a metal organic reaction with acetaldehyde, the triple bond of the 2-methyl-6-hydroxypenten-(2)-in-(4)-al-(1)-acetal obtained was partially hydrogenated. The hydroxy group was then oxidized with manganese dioxide.

*2,6,6-trimethylcyclohexyliden-ethylen-t r i a r y l p h o s-phine.*—28 g. of 2,6,6-trimethylcyclohexanone-(1) were added to a solution of lithium acetylide (prepared from 1.5 g. lithium in 700 ml. of liquid ammonia) and the mixture was stirred for 12 hours. Then 10 g. of ammonium chloride were added, the ammonia was driven off and the residue taken up in diethyl ether. From this solution the solvent was driven off and the residue was distilled in vacuo, whereby 32 g. of 2,6,6-trimethyl-1-ethinyl-cyclohexanol (B. P.$_{10}$ 82–83°; $n_D^{21}$=1.4774) were obtained. The latter was dissolved in 150 ml. of petroleum ether and hydrogenated at atmospheric pressure in the presence of 0.3 ml. of quinoline and 3 g. of palladium lead catalyst (Lindlar, Helv. Chim. Acta 35 [1952], 450). Upon 1 mol of hydrogen was taken up, the catalyst was separated by filtration, the solvent was driven off and the crude 2,6,6-trimethyl-1-vinyl-cyclohexanol was dissolved in 90 ml. of benzene and treated at 50–60° with a little more than the calculated quantity of phosphorus tribromide. After the reaction was completed the benzene solution was separated from the phosphorous acid formed, washed with cold sodium bicarbonate solution and water, dried over sodium sulfate and mixed with a solution of the equimolar quantity of triphenyl phosphine in a little benzene. The reaction mixture was allowed to stand for 15 hours. Then the crystalline 2,6,6-trimethylcyclohexyliden - ethyl - triphenylphosphonium bromide was collected and dried in vacuo (M. P. 217–218°). To 12.2 g. of 2,6,6-trimethylcyclohexyliden-ethyl-triphenylphosphonium bromide suspended in 125 ml. of dry diethyl ether was added in a nitrogen atmosphere a solution of 2.1 g. phenyl lithium in ether. The phosphonium bromide solubilised in an exothermic reaction and there was obtained a deep red solution of 2,6,6-trimethylcyclohexyliden-ethyliden-triphenylphosphine which could be used without further purification for the process of Example 1.

EXAMPLE 2

(a) *4-[2,6,6-trimethylcyclohexyliden]-2-methyl-butene-(2)-al-(1)-diethyl-acetal*

3 g. of 1,1-diethoxypropanone-(2) were condensed with 2,6,6-trimethylcyclohexyliden - ethyliden - triphenylphosphine as described in Example 1 above. There was thus obtained 4-[2,6,6-trimethylcyclohexyliden]-2-methylbuten-(2)-al-(1)-diethyl-acetal showing an absorption maximum in the ultraviolet spectrum at 248 mµ in petroleum ether.

(b) *4-[2,6,6-trimethylcyclohexyliden]-2-methyl-butene-(2)-al-(1)*

5 g. of 4-[2,6,6-trimethylcyclohexyliden]-2-methyl-butene-(2)-al-(1)-diethyl-acetal dissolved in 90 ml. of glacial acetic acid were mixed with 10 ml. of water and 10 g. of sodium acetate and the mixture was heated for 2 hours at 95°. 200 ml. of water were then added, and the mixture was extracted with petroleum ether; the petroleum ether solution was washed with water and 5% sodium bicarbonate solution, dried over sodium sulfate and the solvent was driven off. After distillation in vacuo there was obtained 4-[2,6,6-trimethylcyclohexyliden]-2-methyl-butene-(2)-al-(1) of B. P.$_{0.02}$: 85°; U. V. absorption maximum at 288 mµ in petroleum ether.

We claim:

1. A process for the manufacture of polyene aldehydes, which comprises condensing in an inert solvent a compound selected from the group consisting of 2,6,6-trimethylcyclohexyliden - ethyliden - triarylphosphine, 2,6,6 - trimethylcyclohexyliden-ethyliden-tri(alkyl-substituted aryl) phosphine and 2,6,6-trimethylcyclohexyliden-ethyliden-tri(alkoxy-substituted aryl) phosphine with a compound selected from the group consisting of acetals of 2-oxo-propanal-(1), of 4-oxopentene-(2)-al-(1) and of 2-methyl-6-oxo-heptadiene-(2,4)-al-(1), heating the reaction mixture and hydrolyzing the acetal formed in the presence of acid.

2. A process for the manufacture of a polyene aldehyde which comprises condensing in an inert solvent 2,6,6 - trimethylcyclohexyliden - ethyliden - triphenylphosphine and a 2-oxo-propanal-(1)-acetal, heating the reaction mixture and hydrolyzing the acetal formed in the presence of acid.

3. A process according to claim 2 wherein 2-oxo-propanal-(1)-ethylene-acetal is employed.

4. A process according to claim 2 wherein 2-oxo-propanal-(1)-dialkyl-acetal is employed.

No references cited.